(12) United States Patent
Sjulsen et al.

(10) Patent No.: US 11,488,347 B2
(45) Date of Patent: Nov. 1, 2022

(54) METHOD FOR INSTANT RENDERING OF VOXELS

(71) Applicant: MY VIRTUAL REALITY SOFTWARE AS, Oslo (NO)

(72) Inventors: Jørn Are Sjulsen, Jar (NO); Roy Morten Brenna, Porsgrunn (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 0 days.

(21) Appl. No.: 17/367,208

(22) Filed: Jul. 2, 2021

(65) Prior Publication Data

US 2022/0005261 A1 Jan. 6, 2022

(30) Foreign Application Priority Data

Jul. 6, 2020 (EP) .................................... 20184211

(51) Int. Cl.
*G06T 15/20* (2011.01)
*G06T 17/00* (2006.01)
*G06T 15/00* (2011.01)

(52) U.S. Cl.
CPC ............ *G06T 15/20* (2013.01); *G06T 15/005* (2013.01); *G06T 17/00* (2013.01); *G06T 17/005* (2013.01); *G06T 2210/36* (2013.01)

(58) Field of Classification Search
CPC ....... G06T 15/005; G06T 15/20; G06T 17/00; G06T 17/005; G06T 2210/36
See application file for complete search history.

(56) References Cited

U.S. PATENT DOCUMENTS

| 4,710,876 | A | | 12/1987 | Cline et al. | |
|---|---|---|---|---|---|
| 5,166,876 | A | * | 11/1992 | Cline | G06T 17/00 345/424 |
| 7,477,768 | B2 | * | 1/2009 | Kaufman | G06T 7/136 382/128 |
| 7,853,310 | B2 | * | 12/2010 | Vining | G06T 7/155 382/199 |

OTHER PUBLICATIONS

Palmer, Sean, Eric Maurer, and Mark Adams. "Using sparse voxel octrees in a level-of-detail pipeline for Rio 2." ACM Siggraph 2014 Talks. 2014. 1-1. (Year: 2014).*

(Continued)

*Primary Examiner* — Daniel F Hajnik
(74) *Attorney, Agent, or Firm* — Maschoff Brennan

(57) ABSTRACT

A method may include providing geometry data and attribute information of the model in one or more data structures on a data storage device and performing a rendering process for providing a visualization of the model on the display for each of the multitude of viewpoints. The rendering process may include rendering a multitude of like 3D arrays in a single draw call, each array comprising at least eight voxels, removing voxels that are not to be visualized by folding vertices to a centre of the array, computing a distortion on a mapping from voxel space to attribute volume space in dependence on the removed voxels, assigning attributes to the voxels of the multitude of arrays using distorted values for retrieving attribute values from attribute volume space, the attributes being assigned to the remaining voxels according to the computed distortion, and visualizing the voxels of the multitude of arrays.

15 Claims, 7 Drawing Sheets

(56) References Cited

OTHER PUBLICATIONS

EP Search Report in Application No. 20184211.9 dated Dec. 2, 2020.
Slomp et al., "Hardware-Accelerated Geometry Instancing for Surfel and Voxel Rendering of Scanned 4D Media", 11th International Conference on Quality Control by Artificial Vision (QCAV), May 30, 2013.
Sander et al., "Progressive Buffers: View-dependent Geometry and Texture LOD Rendering", Advanced Real-Time Rendering in 3D Graphics and Games—Siggraph Jul. 2005.
Ku et al., "MID-Fusion: Octree-based Object-Level Multi-Instance Dynamic SLAM", 2019 International Conference on Robotics and Automation (IRCA), May 20, 2019.

* cited by examiner

METHOD FOR INSTANT RENDERING OF VOXELS

BACKGROUND

The present invention pertains to the field of three-dimensional (3D) computer graphics and more particularly to an improved computer-implemented method and computer system for visualizing 3D structures using voxels.

Per se, using voxels for rendering 3D scenes is known in the art and used for many applications. It is also known to use 3D computer graphics technology to convert data describing a 3D scene into a two-dimensional (2D) image for viewing on an electronic display screen. For visualizing 3D scenes including structures, a variety of prior art solutions exist, including raytracing, raymarching, cone tracing, visualization of high detail true volumetric data, meshing, marching cubes, dual contouring, greedy meshing and caching, and instanced cubes.

U.S. Pat. No. 4,710,876 A discloses the so-called Marching Cubes algorithm, an algorithm for extracting a polygonal mesh of an isosurface from a three-dimensional discrete scalar field (also called a voxel). The premise of algorithm is to divide the input volume into a discrete set of cubes. By assuming linear reconstruction filtering, each cube, which contains a piece of a given isosurface, can easily be identified because the sample values at the cube vertices must span the target isosurface value. For each cube containing a section of the isosurface, a triangular mesh that approximates the behaviour of the trilinear interpolant in the interior cube is generated.

In real-time computer graphics, geometry instancing is the practice of rendering multiple copies of the same mesh in a scene at once. This technique is primarily used for objects which can be represented as repeated geometry without appearing unduly repetitive. Although vertex data is duplicated across all instanced meshes, each instance may have other differentiating parameters such as colour changed in order to reduce the appearance of repetition. This instanced rendering is nowadays supported by most video hardware, including desktop computers as well as smartphones. This method improves the potential runtime performance of rendering instanced geometry by explicitly allowing multiple copies of a mesh to be rendered sequentially by specifying the differentiating parameters for each in a separate stream.

Geometry instancing usually involves mapping a static or pre-animated object or geometry to particles or arbitrary points in space, which can then be rendered by almost any offline renderer. It allows variation of the texture or colour or other attributes on a per instance basis, which helps ensuring that instances do not appear to be exact copies of each other. Because instancing geometry only references the original object, file sizes are kept very small and changing the original changes all of the instances. The instancing may be achieved by using delayed load render procedurals to only load geometry when the bucket containing the instance is actually being rendered. This means that the geometry for all the instances does not have to be in memory at the same time.

Modern graphics processing units (GPU) are very efficient at manipulating computer graphics and image processing. Their highly parallel structure makes them more efficient than general-purpose central processing units (CPU) for algorithms that process large blocks of data in parallel. Hardware instancing is a known technique which allows a GPU to render multiple identical meshes in a single draw call, varying a limited amount of state (such as position and orientation) for each mesh. This is normally used to reduce the cost of drawing a moderate number of identical low-to-mid-detail meshes.

It would be desirable to provide a practicable and efficient solution for rendering 3D models of structures that combines the advantages of voxel rendering and hardware instancing.

It is therefore an object of the present invention to provide an improved method for efficient rendering of 3D models of large structures.

It is another object to provide such a method that can be performed on a wide variety of hardware, including personal computers and mobile devices.

It is another object to provide such a method that reduces the required memory for storing the model data.

It is another object, to provide such a method that reduces the time for rendering and allows for a higher framerate when the model is visualized sequentially from different viewpoints.

It is another object, to provide such a method that reduces the needed computing capacity and power consumption on the rendering device.

It is another object of the invention to provide a computer system and a computer programme product for executing said method.

SUMMARY

At least one of these objects is achieved by the method and/or computer system set forth in the claims.

The disclosed embodiments include an algorithm to make use of voxels for visualizing 3D objects or structures. The term "voxel" used in this document particularly relates to voxels in the classical sense, i.e. to three-dimensional volume pixels. This means that according to some embodiments, the voxels may be axis-aligned cubes on a regular grid with a single set of attributes (e.g. texture, colour or material) per voxel.

In some embodiments, in a first step, geometry data is provided in the form of an octree or similar structure that can divide a space into eight or more identical subspaces in a 3D grid. This may comprise acquiring the data, for instance by generating one or more point cloud scans of a structure, or rasterized polygon data related to the structure, and then storing the geometry data on a data storage device accessible by a computer system. The octree is traversed to obtain bitmasks as instancing data for selecting the geometry information that is to be visualized for a respective perspective using voxels. This derivation is based on viewing angles within the octree representing the scene comprising the structure. The term bitmask is used here in a broader sense, i.e. to mean a list of n binary values, e.g. values that can be either true or false, where both the position in the list and the value have significance. For instance, instead of a bitmask in the narrower sense, a list can be used with up to n indices indicating which of the entries have a specific value, where absence of an index indicates the opposite value.

Subsequently, in some embodiments, geometry information of a plurality of 2×2×2 voxel arrays, the data of which is stored in the octree is rendered, wherein attribute information (such as texture) is not yet included. Depending on a current viewpoint, the complete structure or parts thereof are calculated and rendered using a plurality of identical processes that are optimized using the known process of hardware instancing. According to some embodiments, this is achieved by using hardware instancing or similar hardware features (such as, e.g., NVIDIA's mesh shader) to render multiple identical cube arrays, each voxel array (or cube array) comprising eight cubes in a 2×2×2 arrangement. The optimization according to some embodiments is based on handling a plurality of identical processes, for which a certain overhead can be used on the account of the hardware. The attribute information is provided separately, e.g. in a separate buffer, and assigned to the single voxels subsequently. Geometric data processing and subsequent colouring are thus separate steps.

Subsequently, those voxels of the 2×2×2 array that need not be visualized are removed (i.e. "folded away") by folding vertices of these voxels to a centre of the array. Finally, in order to avoid colouring artefacts which would inevitably emerge due to this folding, the attribute geometry (e.g. texture geometry) needs to be changed. To do so, in some embodiments, the texture geometry of a cube is contorted based on calculations, in which calculations those voxels of the 2×2×2 array are considered that have been folded away. The assignment of colouring or other attributes is based on this contorted geometry, so that wrong assignments of colours or other attributes to cube faces bordering cube faces of left-out (folded) voxels are corrected and thus prevented. Advantageously, the attribute data itself is not affected by the contortion of the texture geometry.

Consequently, a first aspect relates to a computer-implemented method for visualizing a three-dimensional model of a structure on a display and sequentially from a plurality of different viewpoints. The method comprises providing geometry data and attribute information of the model in one or more data structures on a data storage device, and performing a rendering process for providing a visualization of the model on the display for each of the multitude of viewpoints. The rendering process comprises the following steps:

rendering a multitude of like elements in a single draw call, wherein the multitude of elements comprise a multitude of three-dimensional arrays, each array comprising at least eight voxels;

removing, in at least a first array of the multitude of arrays, one or more voxels that are not to be visualized, wherein each voxel that is not to be visualized is folded-away by folding vertices of said voxel to a centre of the array;

computing a distortion on a mapping from voxel space to attribute volume space in dependence on the removed one or more voxels;

assigning attributes to the voxels of the multitude of arrays using distorted values for retrieving attribute values from attribute volume space, wherein the attributes are assigned to the remaining voxels according to the computed distortion; and visualizing the voxels of the multitude of arrays on the display.

In particular, the computed distortion is a one-dimensional coordinate distortion, i.e. comprising a deformation of coordinates of the voxel's attribute surface in at least one dimension, particularly only one dimension.

According to one embodiment of the method, hardware instancing is used to render the multitude of like elements in a single draw call. In one embodiment, the step of using hardware instancing to render the multitude of like elements in a single draw call is performed fully automatically by a GPU of a computer system performing the method.

According to another embodiment of the method, the geometry data is organized in a sparse voxel octree. In one embodiment, the method further comprises traversing said octree to obtain bitmasks—also comprising bitmasks in the broader sense—of at least a subset of the geometry data that is to be visualized based on an actual viewpoint.

Preferably, these bitmasks may be 8-bit bitmasks and each of the multitude of arrays may comprise eight cubic voxels in a 2×2×2 setup. Also, each bitmask can be or comprise a list comprising information about which child nodes of a node of the octree comprises valid data. The sparse voxel octree optionally may comprise a hierarchical set of bitmasks indicating the presence of a child node, and any associated attribute information. Additionally or alternatively, removing the voxels can be performed based on the bitmasks.

In another embodiment, the first array corresponds to a node of the octree, wherein local coordinates stored in the node are used for assigning attributes for the voxels in the first array, for instance using a single scale or offset operation.

According to another embodiment of the method, each array of the multitude of three-dimensional arrays represents data at a specific level of detail. A selection of which arrays to include in the rendered multitude may be based on a level-of-detail calculation.

According to another embodiment of the method, no internal faces between voxels of the same array are rendered, and attributes are assigned to formerly internal faces of remaining voxels, formerly internal faces being visible due to the removing of voxels neighbouring said remaining voxels. Computing the distortion may be performed to avoid incorrect attribute assignment due to hardware sampling rules and attribute coordinate rounding operations.

According to another embodiment of the method, rendering the first array comprises accessing a single static index buffer comprising 48×3 indices.

According to another embodiment of the method, each voxel is triangulated to a six-sided polygon around the corners of the voxel.

According to another embodiment of the method, folding vertices comprises folding (only) those vertices that are not shared with one or more voxels that are to be visualized.

According to another embodiment of the method, rendering the first array comprises accessing a single static vertex buffer with at least 27 vertices, each vertex being assigned an associated list of those voxels of the first array which voxels the vertex is used by, for instance wherein the list is stored as a static bitmask array in shader code.

According to another embodiment of the method, the geometry data is generated quantized to an axis-aligned regular three-dimensional grid, e.g. by sampling a three-dimensional function.

According to another embodiment of the method, at least the steps of rendering a multitude of like elements in a single draw call, removing voxels and computing the distortion are performed fully automatically by a GPU of a computer system performing the method.

According to another embodiment of the method, the geometry data is generated based either on one or more point cloud scans of the structure, or on rasterized polygon data related to the structure.

According to another embodiment of the method, the geometry data and the attribute information are provided in separate data structures, particularly wherein the geometry data is organized in a sparse voxel octree or in a Directed Acyclic Graph.

According to another embodiment of the method, the attribute information comprises texture and/or colour information.

According to yet another embodiment of the method, upon receiving an input by a user to change the actual viewpoint to a new viewpoint, the method comprises performing a rendering process for providing a visualization of the model on the display for the new viewpoint. For instance, the input may be received on input means of a computer system performing the method, such as, e.g., a mouse, keyboard or touchscreen.

In one embodiment, the method further comprises traversing the data structure of the geometry data, e.g. the sparse voxel octree, to obtain bitmasks—also comprising bitmasks in the broader sense—of at least a subset of the geometry data that is to be visualized based on the new viewpoint.

A second aspect pertains to a computer system that is configured for performing the method according to the first aspect. The computer system comprises at least a data storage, a GPU, input means, such as, e.g., a mouse, keyboard or touchscreen, and a display device, wherein the GPU is configured to render a multitude of elements in a single draw call.

A third aspect pertains to a computer programme product comprising programme code, which is stored on a machine-readable medium, or being embodied by an electromagnetic wave comprising a programme code segment, and having computer-executable instructions for performing, in particular when run on the computer system according to the second aspect, the method according to the first aspect of the invention.

BRIEF DESCRIPTION OF THE DRAWINGS

The invention in the following will be described in detail by referring to exemplary embodiments that are accompanied by figures, in which.

DETAILED DESCRIPTION

Figure 1:
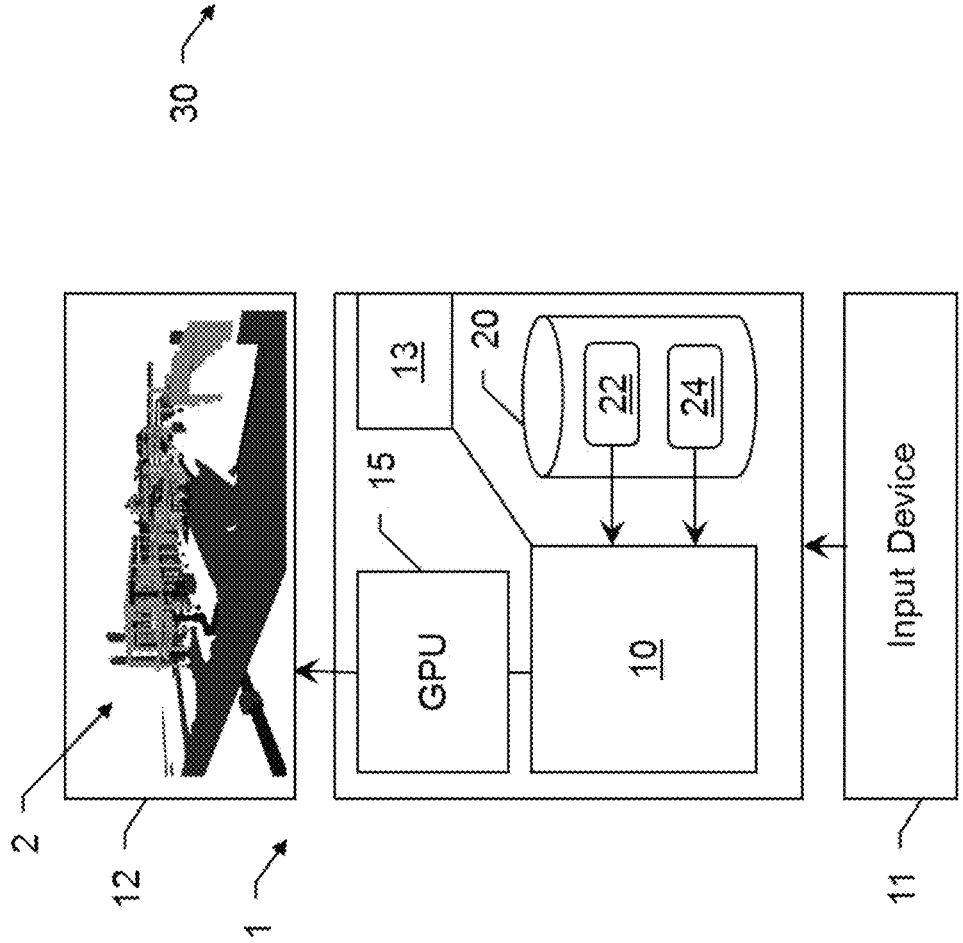
FIG. 1 shows an exemplary computer system according to the invention.

FIG. 1 shows an example embodiment of a computer system 1 according to the invention. It is configured to carry out embodiments of the method described further below. The computer system 1 may comprise a mainboard 10 which includes circuitry for powering and interfacing to at least one on-board processor (not shown here) that may comprise two or more discrete processors or processors with multiple processing cores. The main board 10 may act as an interface between a microprocessor and a memory device 20 of the computer system 1. The memory device 20 may comprise one or more optical, magnetic or solid state drives and may store instructions for an operating system and other software of the computer system 1. The main board 10 may also communicate with random access memory (RAM) and read only memory (ROM) of the computer system 10, the ROM typically storing instructions for a Basic Input Output System (BIOS) which the microprocessor may access and which preps the microprocessor for loading of the operating system.

The main board 10 also interfaces with a graphics processor unit (GPU) 15. In some systems the GPU 15 may be integrated into the main board 10. The main board 10 may be connected to a communications adapter 13—for example comprising a LAN adapter or a modem—that places the computer system 1 in data communication with a computer network such as the internet.

A user of the computer system 1 interfaces with it by means of one or more input devices 11, such as a keyboard or a mouse, and one or more display devices 12.

It will be understood that the computer system 1 comprises an example electronic processor-based system for carrying out the method. However, the method may also be performed with other electronic processor-based systems. Such systems may include tablet, laptop and netbook computational devices, cellular smart phones, gaming consoles and other imaging equipment, e.g. medical imaging equipment.

The user of the system 1 may operate the operating system to load a computer graphics related software product which may be provided by means of download from the internet or as tangible instructions borne upon a computer readable medium such as an optical disk. The computer graphics related software product includes data structures that store data defining various scenes, the data comprising at least geometry data 22 and texture data 24 (or other attribute data). The software product also includes instructions for the GPU 15 to manipulate the scene data in response to inputs received from the user via input device 11.

In some embodiments, an octree data structure is used to store the geometry data 22. However, other types of data structure, for example binary-space partitioning trees might also be used. In particular, any sparse structure which can divide a space into eight or more identical subspaces in a three-dimensional grid can be used, for instance Directed Acyclic Graphs. The texture data 24 is provided in a different data structure. For the purposes of the present invention, this separation is necessary since in practice there is no unique geometry stored, only a single generic 2×2×2 cubic array which is repeatedly used for each of the actual instances of voxel combinations in the scene. The actually unique information is stored in the texture (e.g. the colour) and in the CPU-side octree (the recursive bitmasks).

According to some embodiments, the GPU 15 is configured to render multiple identical meshes in a single draw call. For instance, the GPU 15 may be configured to perform hardware instancing. Hardware instancing is a known technique which allows the GPU 15 to render multiple identical meshes in a single draw call, varying a limited amount of state (such as position and orientation) for each mesh. It is known to use this technique to reduce the cost of drawing a moderate number of identical low-to-mid-detail meshes. Video cards that support hardware instancing are widely-used nowadays in a broad variety of devices, including desktop computers as well as smartphones. These video cards include, for instance, GeForce 6000 and up (NV40 GPU or later), ATI Radeon 9500 and up (R300 GPU or later), and PowerVR SGX535 and up (iPhone 3GS and later).

However, instead of (or in addition to) the widely available hardware instancing, also other more modern hardware features—such as compute shaders, geometry shaders or mesh shaders—can be used to implement, and possibly improve the algorithm. Even if this document at some points specifically mentions hardware instancing, other hardware methods which can generate large amounts of geometry by reusing a small input data set may be operational as well.

As described further below, according to some embodiments, hardware instancing is used to render multiple identical three-dimensional cube arrays. Each array is then adapted individually as necessary for visualizing a scene comprising the 3D model 2 with the correct geometry and texture information. Utilizing available hardware capabilities of the system 1, in particular provided on the side of the GPU 15, all of these steps can be performed fully automatically, highly efficient and in real time.

Figure 2:
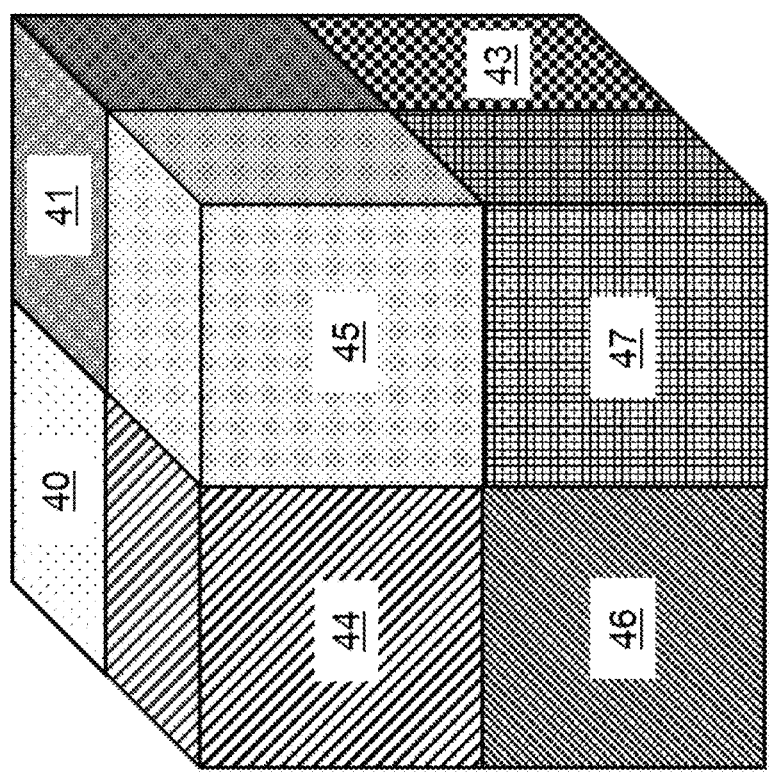
FIG. 2 shows a first exemplary array of voxels generated by hardware instancing.

FIG. 2 illustrates an example embodiment of such a 3D array 30. The shown cube array comprises eight cubes or voxels 40-47 (voxel 42 not being visible) in a 2×2×2 arrangement. The local XYZ coordinates of the cubes are in the range of −1 to 1.

Mapping from XYZ coordinates to cube index:

Index=$X≥0?1:0|$ $Y≥0?2:0|$ $Z≥0?4:0.$

Mapping from local space to world space can be performed in a single scale/offset operation. Of course, it is possible to use different arrangements of voxels, both with higher or lower number of voxels in an array. The 2×2×2 arrangement presented in this document relates to an exemplary embodiment that preferably can be used together with geometry data that is stored in an octree.

Figure 3:
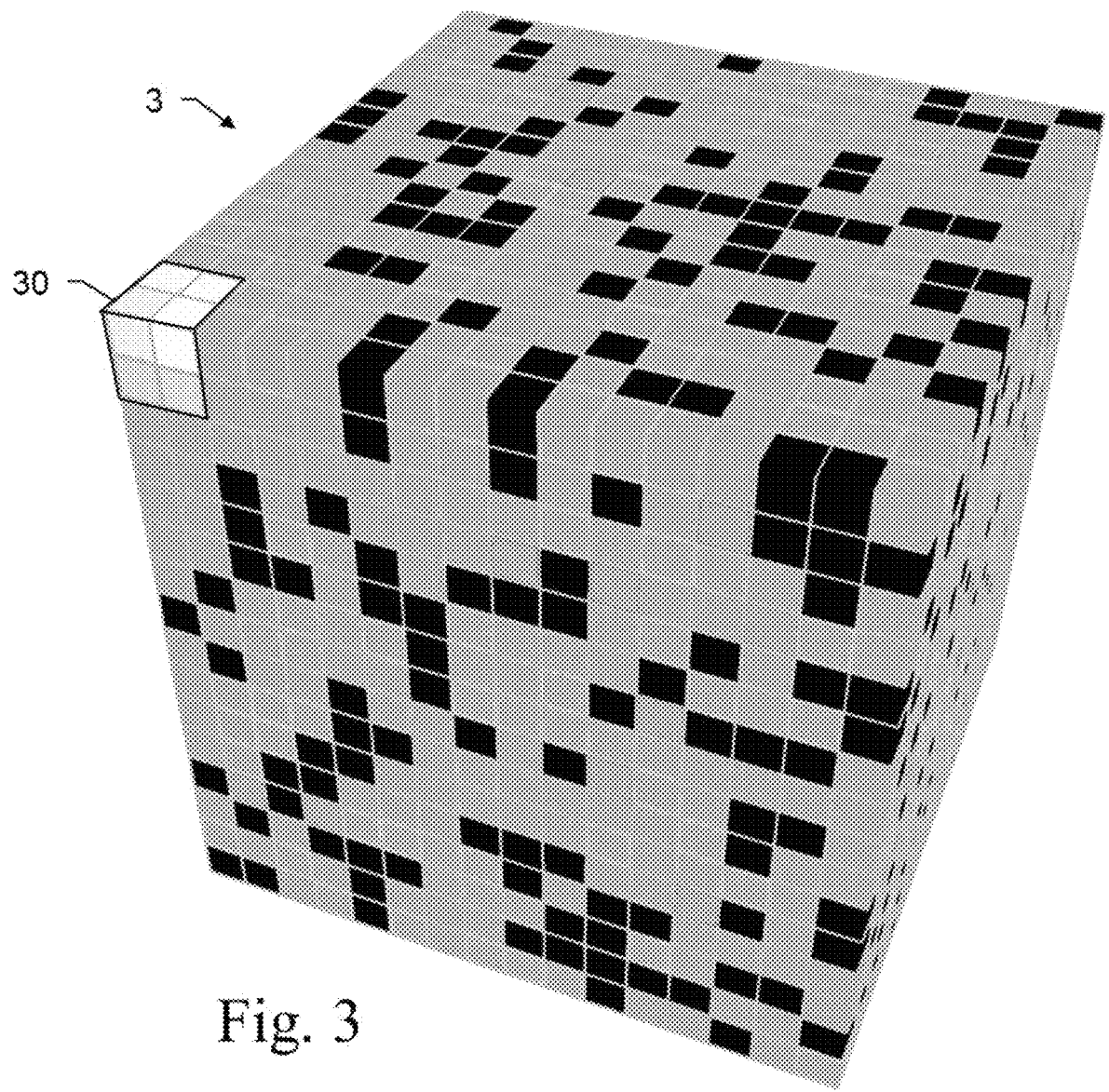
FIG. 3 shows an exemplary multitude of arrays generated by hardware instancing including the first array of FIG. 2.

FIG. 3 shows an example of a multitude 3 of arrays being generated using hardware instancing, the array 30 of FIG. 2 being highlighted in the top left corner. Colours for each one of the multitude 3 of arrays get tightly packed as 2×2×2 blocks into a 3D texture. Empty data blocks are shown in black.

In an alternative embodiment, a single 2×2×2 block in the 3D texture can hold the attribute (e.g. colour) data for multiple arrays with non-intersecting bitmasks. In many cases, this can be used to significantly reduce the size of the 3D texture data.

The hardware instancing can be seen as a two-step process. The CPU-side generation of the instancing data, i.e. the information which says where to draw and how to colour each individual instance, needs to be generated from the CPU-side octree whenever the viewpoint changes significantly. This can be done according to heuristics. The result of this step is stored in a temporary buffer, which is reused for as long as it stays valid. The application of this instancing data during rendering is however performed on the fly by the GPU, and is a process which the graphics hardware is designed to do repeatedly and efficiently.

The instancing data is generated by traversing the CPU side sparse octree. Only blocks with at least one visible voxel are added to the instancing data. If any traversed node ends up with an empty bitmask, which can happen if all its child nodes are added to the instancing data, it itself will not be added to the instancing data.

Each array corresponds to a node of an octree, in which geometry data of an object to be visualized is stored. Local coordinates of these nodes are used as mapping coordinates using a single scale/offset operation.

Sampling of the 3D texture can be done with point filtering in fragment shader.

The required information per array then comprises:
position (XYZ),
scale or LOD level,
attributes, such as texture/colour, (UVW), and
visible cubes bitmask.

Scale or LOD level directly corresponds to the level in the octree. Texture/colour is an offset into the 3D texture, used in combination with the local coordinates of the node, to obtain the mapping coordinates.

In theory, this information comprises up to 168 bits, but in practice, depending on the size of the input data, reduction to at least 64 bits is possible.

Figure 4:
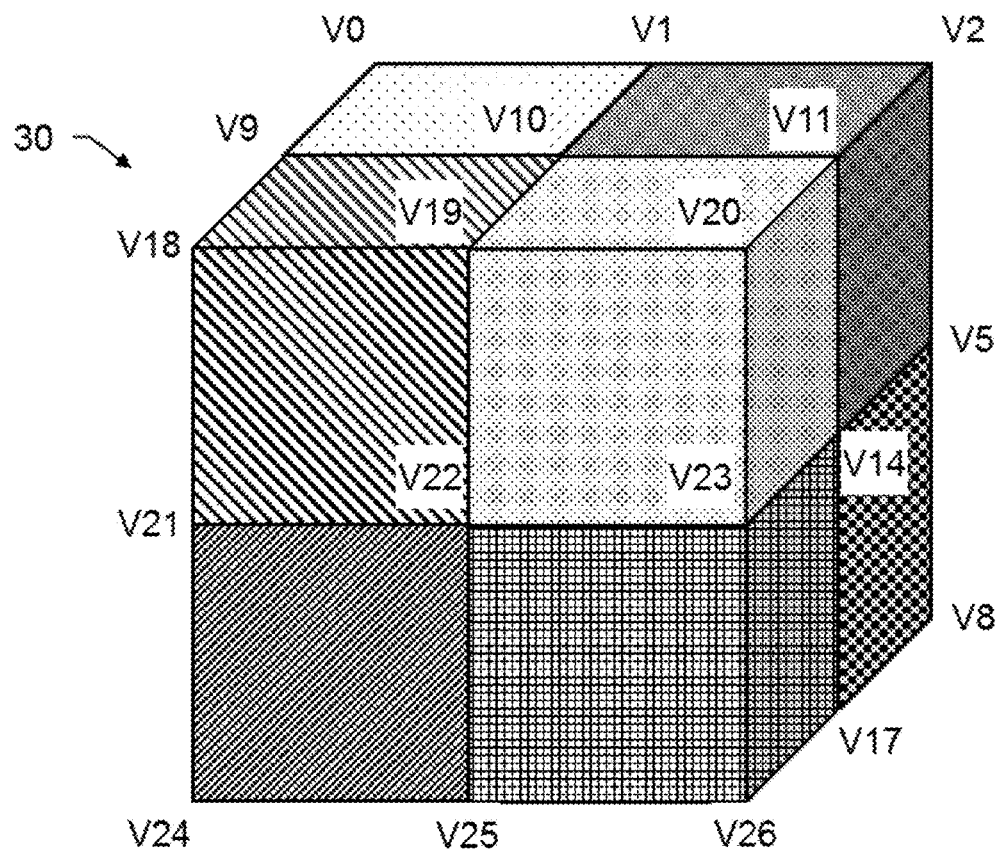
FIG. 4 illustrates vertices in the first array.

FIG. 4 shows the array 30 of FIG. 2, illustrating the 27 vertices V0-V26 of the array (not all vertices are visible).

A single static vertex buffer with the 27 vertices, sorted by increasing X, Y, Z values can be used as input vertex buffer. Mapping from index to local space coordinates can either be stored in the vertex buffer, or directly in the vertex shader code.

Each vertex V0-V26 has an associated list of those cubes it is used by (cube usage mask), stored as a static bitmask array in the shader code. Vertex V13, constituting the centre of the eight cubes, is not actually used by the rendering and has a usage mask of 0xFF.

Figure 5A:
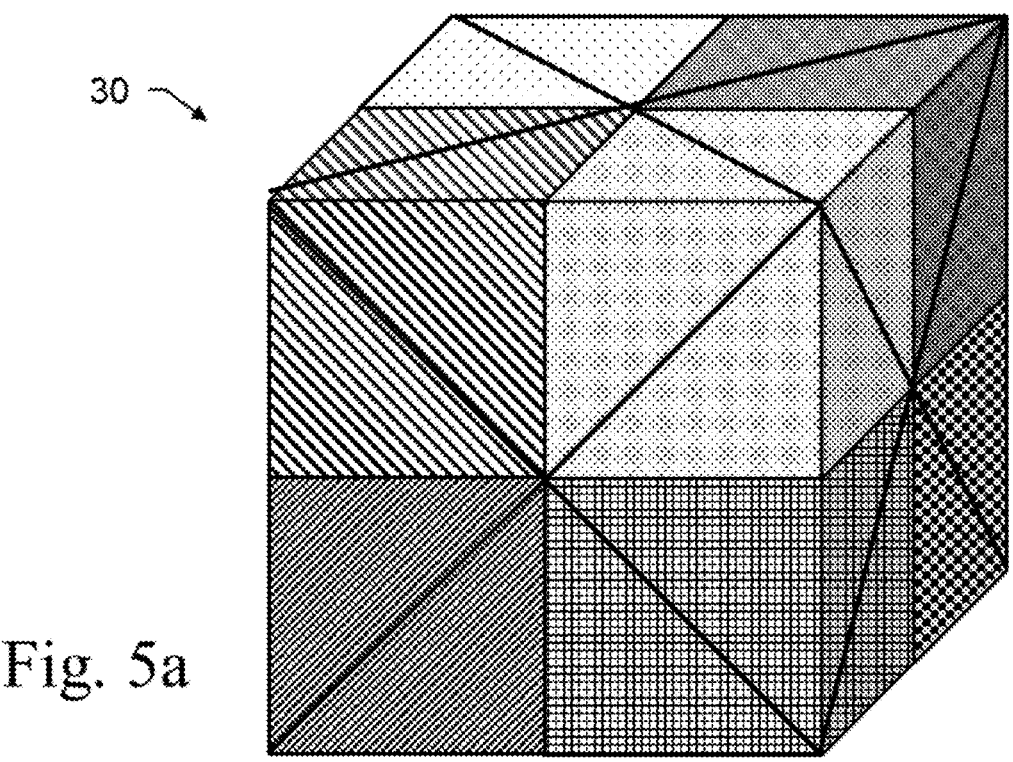
FIGS. 5*a-c* illustrate the folding of unused voxels of the first array.
Figure 5B:
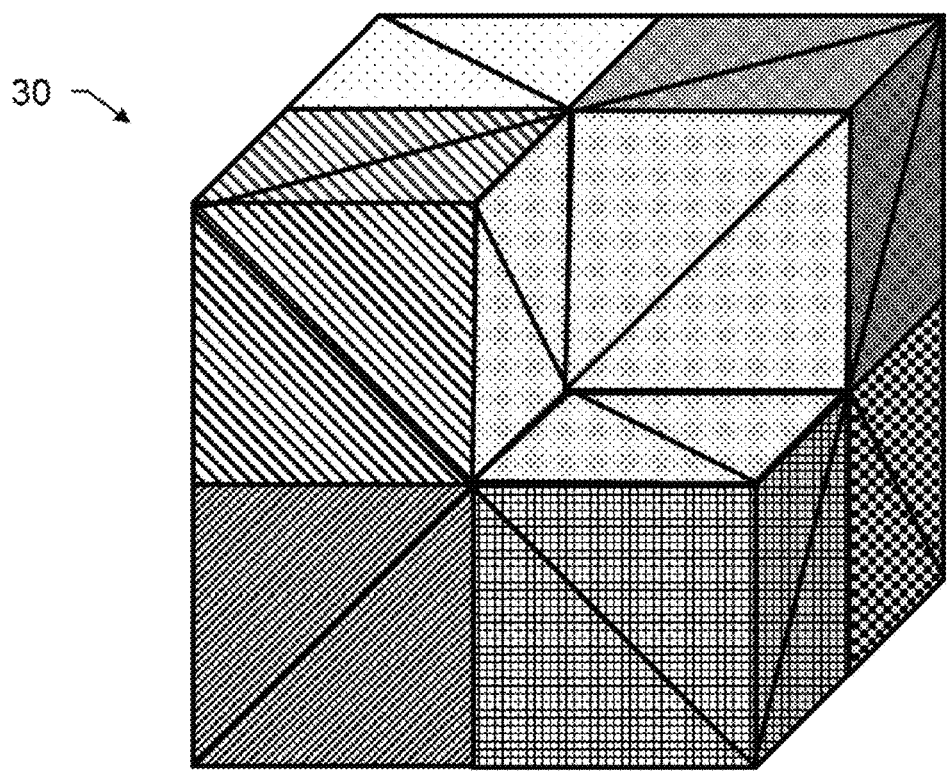
Figure 5C:
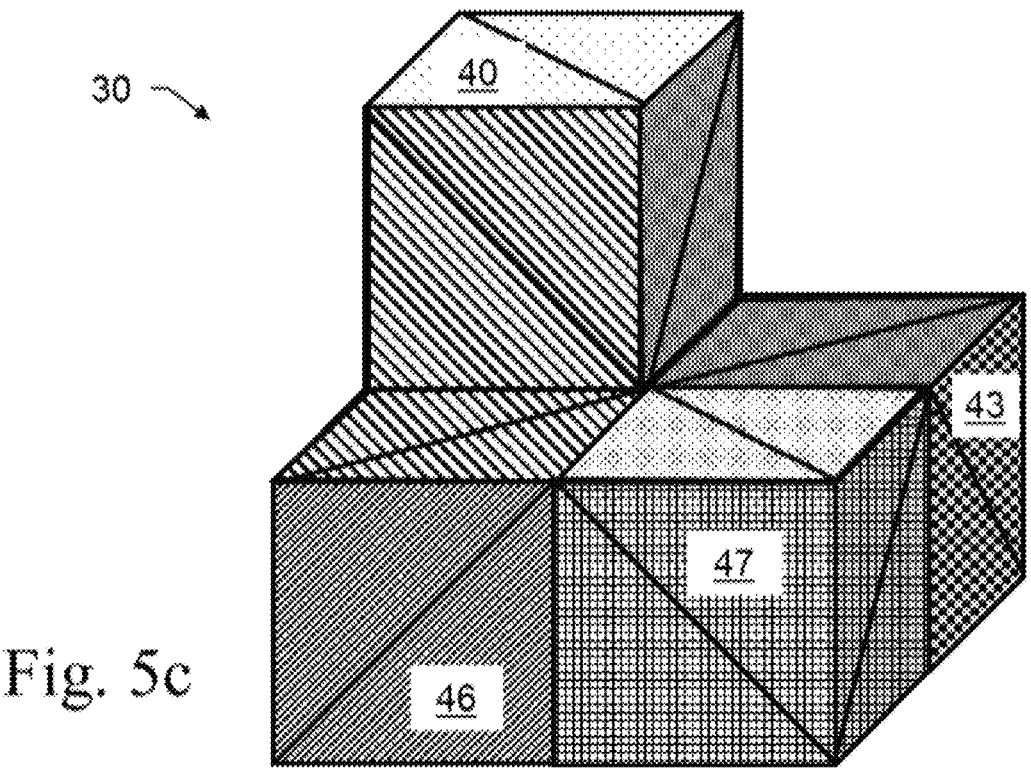

FIGS. 5*a-c* illustrate the process of removing unused cubes by "folding-away". As illustrated by FIG. 5*a*, a single static index buffer comprising 48×3 indices is used as input index buffer, with each cube of the array 30 being triangulated to a six-sided polygon around the corner of the cube, the triangles being formed by the cube's vertices. Because of the index buffer layout, no internal faces between the cubes are ever rendered.

In FIG. 5*b*, one cube has been removed, and in FIG. 5*c*, three of the eight cubes of the array 30 have been removed. This is performed by folding unused triangles, i.e. those of the unused cubes, to the zero area, e.g. to the centre of the array, so that the triangles are quickly rejected by the hardware. Summarized, removing an unused cube by "folding away" comprises folding those vertices (in particular comprising the triangles formed by these vertices) of the unused cube that are not shared with any other, still visible, cubes.

That way, in a "worst case", i.e. if seven of the eight cubes are folded away, 48 triangles are necessary to render a single cube, which is not very efficient. However, in the best case, i.e. if no cube of the array needs to be removed, eight cubes result from the same 48 triangles.

In a next step, attributes, such as texture and colours, need to be assigned to the remaining voxels, i.e. to those cubes that have not been folded away. On the modified triangles, texture and colours are determined based on hardware sampling rules and texture coordinate rounding operations performed by the GPU. Without applying the corrections described further below, after the folding usually about every second of the triangles would be assigned incorrect texture and colours, which is not acceptable for many applications.

This hardware-inherent problem is illustrated in FIGS. 5*b* and 5*c*, where the previously invisible internal faces have been assigned wrong colours. That is, instead of having assigned the colours of those cubes the now visible faces are associated with, the hardware incorrectly has assigned the colours of the unused, now folded-away cubes.

In the example of FIG. 5c, the remaining voxels 40, 43, 46 and 47 previously were neighbours to voxels that have been removed. Consequently, previously invisible internal faces of these cubes (i.e. faces that would not have been rendered, if no voxels would have been removed) are now visible and therefore need to have some texture assigned. Due to above-mentioned hardware-inherent problems, this assignment is often incorrect. As can be seen in the example of FIG. 5c, those faces of the remaining voxels 40, 43, 46 and 47 that previously have been internal faces, incorrectly have been assigned the texture of the removed voxels and not that of the remaining voxels.

According to some embodiments, this problem is solved by using the correction as described below.

Figure 6:
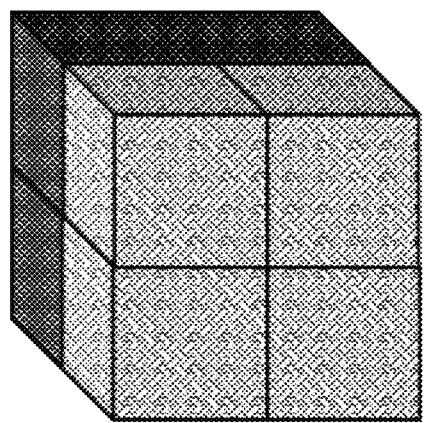
FIG. 6 illustrates the modification of mapping coordinates.
Figure 6:
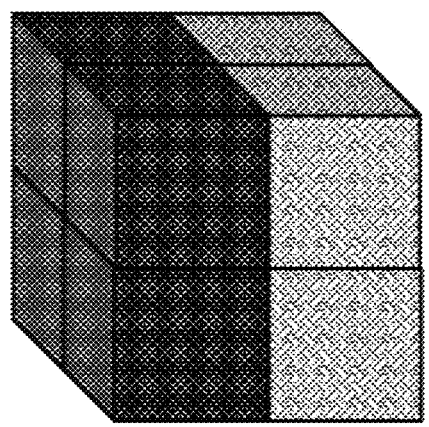
Figure 6:
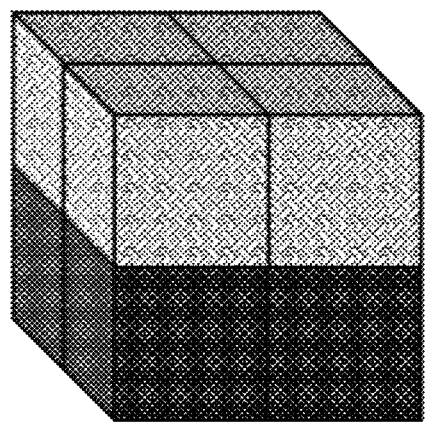

FIG. 6 illustrates modification of mapping coordinates. The arrays are divided into positive (light) and negative (dark) half-spaces along each axis. Mapping coordinates are adjusted for vertices along each axis where the number of visible cube influences is different in the positive/negative spaces. The magnitude of correction is a function of cube usage count for the respective vertex V0-V26 and may also depend on specifications of the used hardware, e.g. of the GPU. Consequently, exact knowledge of hardware behaviour can be used to determine the exact values for the magnitude of correction.

Figure 7A:
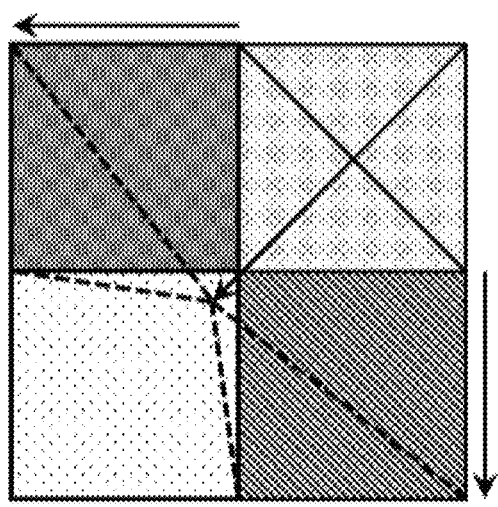
FIGS. 7*a-b* illustrate a distortion of a texture surface of the voxels of an array.
Figure 7B:
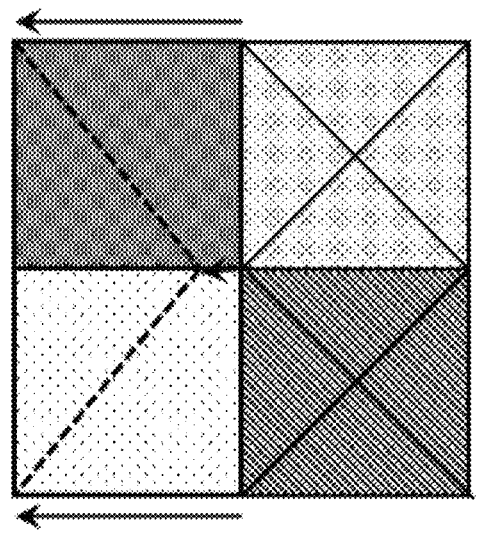

FIGS. 7a-b illustrate the distortion of the texture surface (or other attribute surface) on two exemplary arrays. Computing a distortion (e.g. a one-dimensional deformation) is necessary to trick the hardware into assigning always the correct attribute, such as texture and/or colour. The arrays are shown in 2D for reasons of simplicity. In the example of FIG. 7a, the top right cube has been removed, and in the example of FIG. 7b, the two cubes on the right have been removed. In both cases, the arrows indicate the distorting movement of the mapping coordinates.

These movements include only distortions to the mapping coordinates and not changing any vertex positions used for rendering. The distortion is computed on a mapping from voxel space to attribute volume space. The distortion needs to be one-dimensionally only.

Preferably, the movement of the centre vertex should be as small as possible, just enough to round the mapping coordinates into the right direction. Accordingly, in the shown examples the arrow indicating the movement of the respective centre vertex is rather short. The vertices on the outer edges of the array however, in the shown examples are moved completely towards the corners of the array. The vertical texture offset is 0, and horizontal offsets are now required both along the top and bottom edges. Required texture coordinate modifications can also be detected using simple bit operations in the shader.

Figure 8:
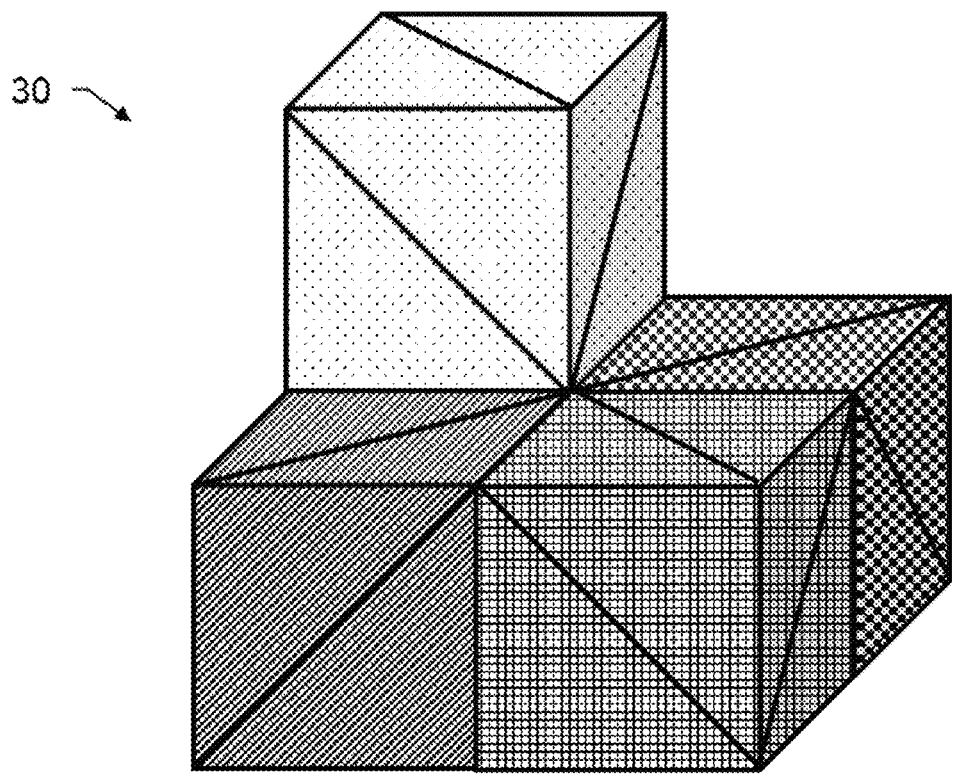
FIG. 8 shows the first array, wherein unused voxels are removed and the texture assignment is corrected.

FIG. 8 shows an array 30 with the corrected assignment of colour according to the invention. Previously not rendered internal faces now show the colour of that cube the now visible face is associated with. The shown array 30 is the same as depicted in FIG. 5c, where the colours had been assigned incorrectly.

Since texture offset corrections are symmetrical along each axis, texel boundaries match correctly with the cube boundaries. Careful scaling of offsets in the centre of the array is required to avoid colour bleed from removed cubes.

Correcting the colour and texture assignment is performed for each array individually. In more detail, the steps of removing cubes and computing the distortion are performed independently and in parallel, for each of 26 vertices (not for the centre vertex) of each array. Each vertex "knows" how to perform these steps simply by looking at the visible cubes' bitmask, and does not need information from the other vertices to do it. These steps are repeated whenever the viewpoint, or anything else which would change the scene, i.e. the current rendered image, is changed. These steps are however not separate steps as such, but performed completely by the GPU on the fly—automatically and in real time—as a part of the rendering process.

Each rendered array represents data of a part of the source dataset at a specific level of detail (LOD). Also, different parts of the octree can be rendered at different LOD. Masking out the corresponding bit from a node's instance data when traversing down a child node will automatically remove the corresponding cube from the current node. If all children are traversed, the resulting mask is 0 and the node does not need to be rendered. A selection of which arrays to include in the rendered set of arrays is consequently also based on their LOD.

Figure 9:
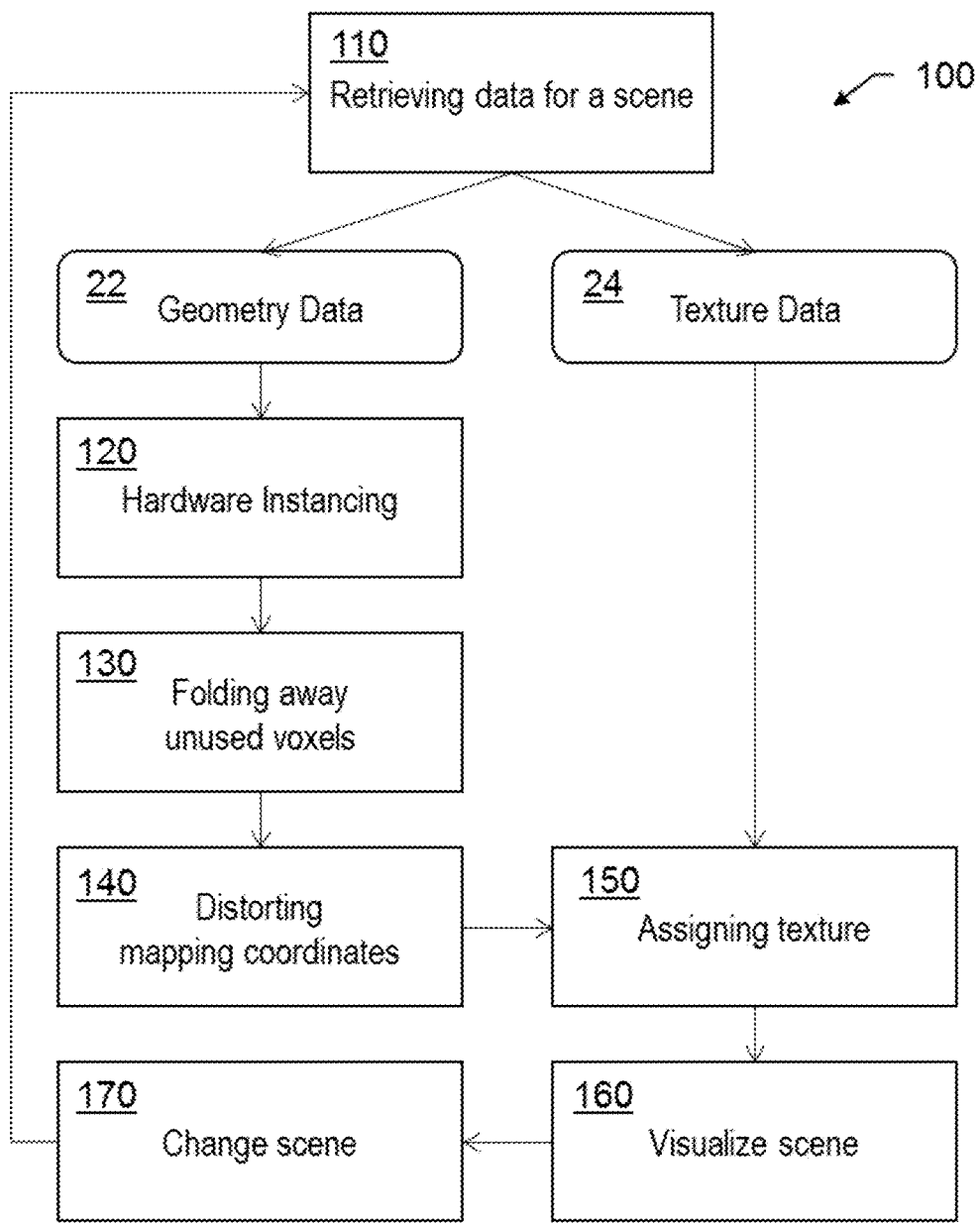
FIG. 9 shows a flow-chart illustrating an exemplary embodiment of a method according to the invention.

FIG. 9 shows a flowchart illustrating an example embodiment of a method 100 for visualizing, on a display and sequentially from a plurality of different viewpoints, a 3D model of a structure.

In a first step, data for a scene, i.e. a view on the structure from a first viewpoint, is retrieved 110, e.g. from a data storage device of the computer system used for performing the method 100. This comprises retrieving geometry data 22 that is stored in an octree and texture data 24 (or other attribute data) that may be stored in a separate data structure. Retrieving 110 the geometry data comprises traversing the octree to obtain the data that is necessary to render the geometry that is visible in the scene.

Based on the retrieved geometry data 22, available hardware capabilities of the system, in particular provided on the side of the GPU, are utilized to render multiple identical voxel arrays in a single draw call. In the exemplary embodiment illustrated in FIG. 9, the GPU performs hardware instancing 120 to render the multiple identical voxel arrays in a single draw call, each voxel array comprising eight cubic voxels in a 2×2×2 arrangement.

Since not all voxels of all the 2×2×2 arrays need to be visualized, unused voxels will be folded away 130 (i.e. removed), as described above with respect to FIGS. 5a-c. This step is also performed by the GPU.

Having folded away some of the voxels, the GPU cannot ensure that colours, texture or other attributes will be assigned correctly to some faces of voxels of the same array, if these faces are previously internal faces that are only visible due to the folding-away of an unused voxel. Consequently, mapping coordinates of voxels being neighbours to folded-away voxels are distorted 140 to allow correct colour or texture assignment to all faces. This step is also performed by the GPU and illustrated above with respect to FIGS. 6 and 7a-b.

Having performed the steps 120, 130 and 140 by means of the GPU, the texture, colour or other attributes can be assigned 150 (or sampled) to the voxels, and the scene with a view of the 3D model can be visualized 160 on a screen of the computer system. If the scene changes 170, e.g. due to a movement of a viewpoint or a zooming in or out by the user, the steps of the method 100 are repeated, starting with retrieving 110 the data for the new scene.

Preferably, all steps of the illustrated method 100 are performed fully automatically and in real time by a computer system, e.g. the system 1 depicted in FIG. 1. Only step 170, i.e. changing the scene, may involve a user input.

Although the invention is illustrated above, partly with reference to some preferred embodiments, it must be understood that numerous modifications and combinations of different features of the embodiments can be made. All of these modifications lie within the scope of the appended claims.

The invention claimed is:

1. Computer-implemented method for visualizing, on a display and sequentially from a plurality of different viewpoints, a three-dimensional model of a structure, the method comprising:
providing geometry data and attribute information of the model in one or more data structures on a data storage device;
performing a rendering process for providing a visualization of the model on the display for each of the multitude of viewpoints, the rendering process comprising:
rendering a multitude of like elements in a single draw call, wherein the multitude of elements comprise a multitude of three-dimensional arrays , each array comprising at least eight voxels;
removing, in at least a first array of the multitude of arrays, one or more voxels that are not to be visualized, wherein each voxel that is not to be visualized is folded-away by folding vertices of said voxel to a zero point or center of the array;
computing a distortion on a mapping from voxel space to attribute volume space in dependence on the removed one or more voxels;
assigning attributes to the voxels of the multitude of arrays using distorted values for retrieving attribute values from attribute volume space, wherein the attributes are assigned to the remaining voxels according to the computed distortion; and
visualizing the voxels of the multitude of arrays on the display.

2. Method according to claim 1, wherein hardware instancing is used to render the multitude of like elements in a single draw call, particularly wherein the step of using hardware instancing to render the multitude of like elements in a single draw call is performed fully automatically by a graphics processing unit of a computer system performing the method.

3. Method according to claim 1, wherein the geometry data is organized in a sparse voxel octree and the method further comprises traversing the octree to obtain bitmasks of at least a subset of the geometry data that is to be visualized based on an actual viewpoint, particularly wherein:
the bitmasks are 8 bit bitmasks and each of the multitude of arrays comprises eight cubic voxels in a 2×2×2 setup; and/or
each bitmask is or comprises a list comprising information about which child nodes of a node of the octree comprises valid data; and/or
the sparse voxel octree comprises a hierarchical set of bitmasks indicating the presence of a child node, and any associated attribute information; and/or
removing the voxels is based on the bitmasks.

4. Method according to claim 3, wherein the first array corresponds to a node of the octree, wherein local coordinates stored in the node are used for assigning attributes for the voxels in the first array , particularly using a single scale or offset operation.

5. Method according to claim 1, wherein each array of the multitude of three-dimensional arrays represents data at a specific level of detail, particularly wherein a selection of which arrays to include in the rendered multitude is based on a level-of-detail calculation.

6. Method according to claim 1, wherein:
no internal faces between voxels of the same array are rendered; and
attributes are assigned to formerly internal faces of remaining voxels, wherein formerly internal faces are visible due to the removing of voxels neighbouring said remaining voxels,
particularly wherein computing the distortion is performed to avoid incorrect attribute assignment due to hardware sampling rules and attribute coordinate rounding operations.

7. Method according to claim 1, wherein:
rendering the first array comprises accessing a single static index buffer comprising 48×3 indices; and/or
each voxel is triangulated to a six-sided polygon around the corners of the voxel; and/or
the vertices of a voxel form triangles on the surfaces of the voxel, and folding vertices comprises folding triangles formed by these voxels; and/or
folding vertices comprises folding those vertices that are not shared with one or more voxels that are to be visualized, in particular only folding those vertices.

8. Method according to claim 1, wherein rendering the first array comprises accessing a single static vertex buffer with at least 27 vertices, each vertex being assigned an associated list of those voxels of the first array which voxels the vertex is used by, particularly wherein the list is stored as a static bitmask array in shader code.

9. Method according to claim 1, wherein the geometry data is generated quantized to an axis-aligned regular three-dimensional grid, particularly by sampling a three-dimensional function.

10. Method according to claim 1, wherein at least the steps of rendering a multitude of like elements in a single draw call, removing voxels and computing the distortion are performed fully automatically by a graphics processing unit of a computer system performing the method.

11. Method according to claim 1, wherein the geometry data is generated:
based on one or more point cloud scans of the structure, or
based on rasterized polygon data related to the structure.

12. according to claim 1, wherein:
the geometry data and the attribute information are provided in separate data structures, particularly wherein the geometry data is organized in a sparse voxel octree or in a Directed Acyclic Graph; and/or
the attribute information comprises texture and/or colour information.

13. Method according to claim 1, wherein upon receiving, particularly on input means of a computer system performing the method, an input by a user to change the actual viewpoint to a new viewpoint, the method comprises performing a rendering process for providing a visualization of the model on the display for the new viewpoint,
particularly wherein the method further comprises traversing the data structure of the geometry data, particularly wherein the geometry data is organized in a sparse voxel octree, to obtain bitmasks of at least a subset of the geometry data that is to be visualized based on the new viewpoint.

14. Computer system comprising a data storage, a graphics processing unit, input means and a display, the graphics processing unit being configured to render a multitude of elements in a single draw call, wherein the computer system is configured for performing the method according to claim 1.

15. Computer program product comprising program code, which is stored on a non-transitory machine-readable medium, comprising a program code segment, and having computer-executable instructions for performing the method according to claim 1.

* * * * *